Aug. 29, 1933.  M. J. ADAMS  1,924,388
RUNNING GEAR
Filed Oct. 19, 1931  2 Sheets-Sheet 1
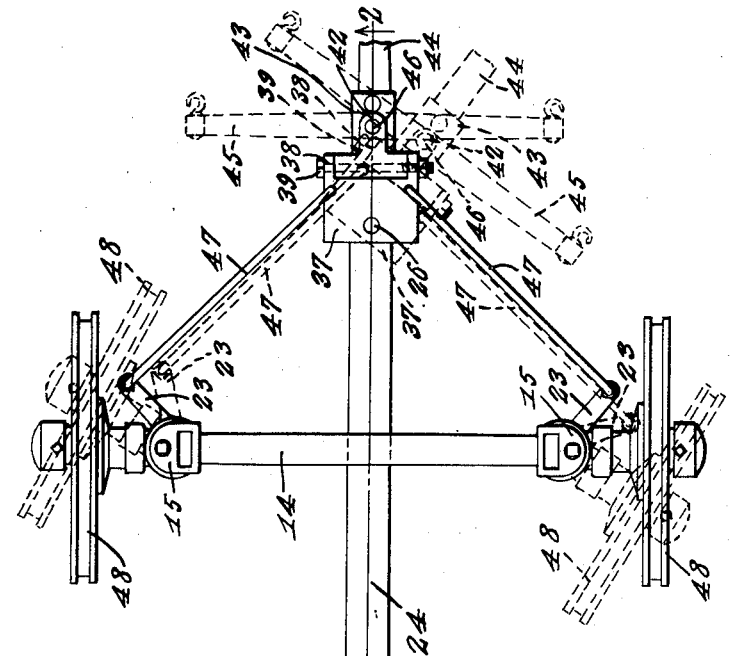
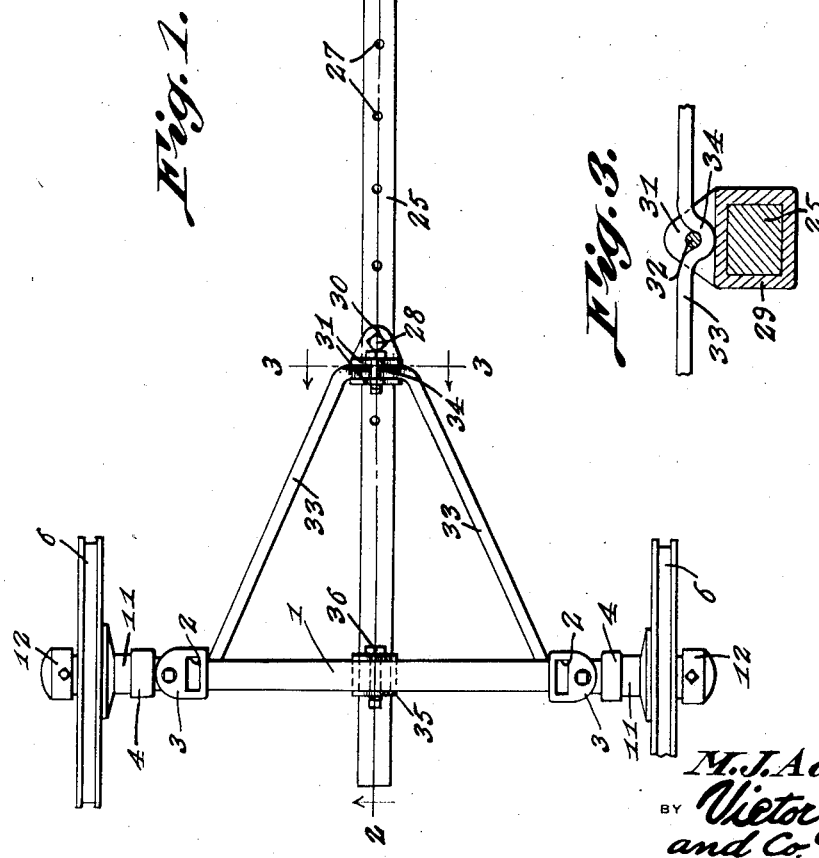
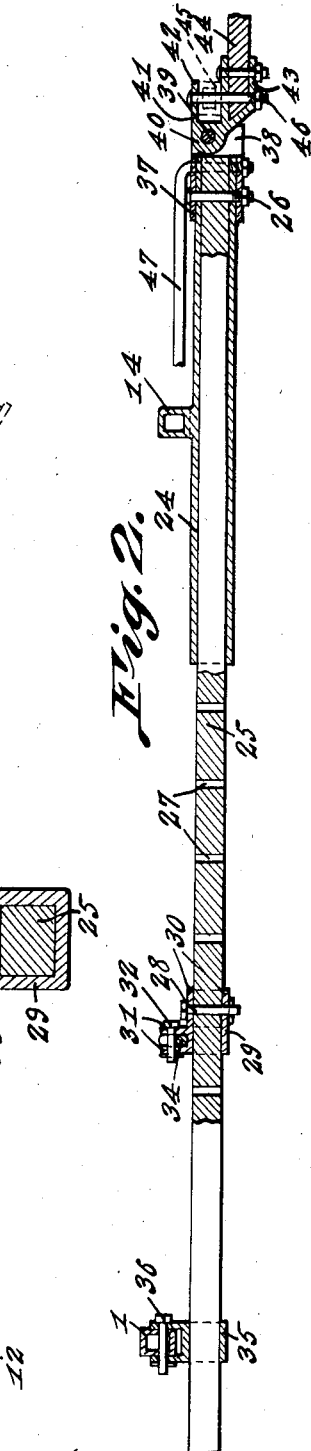

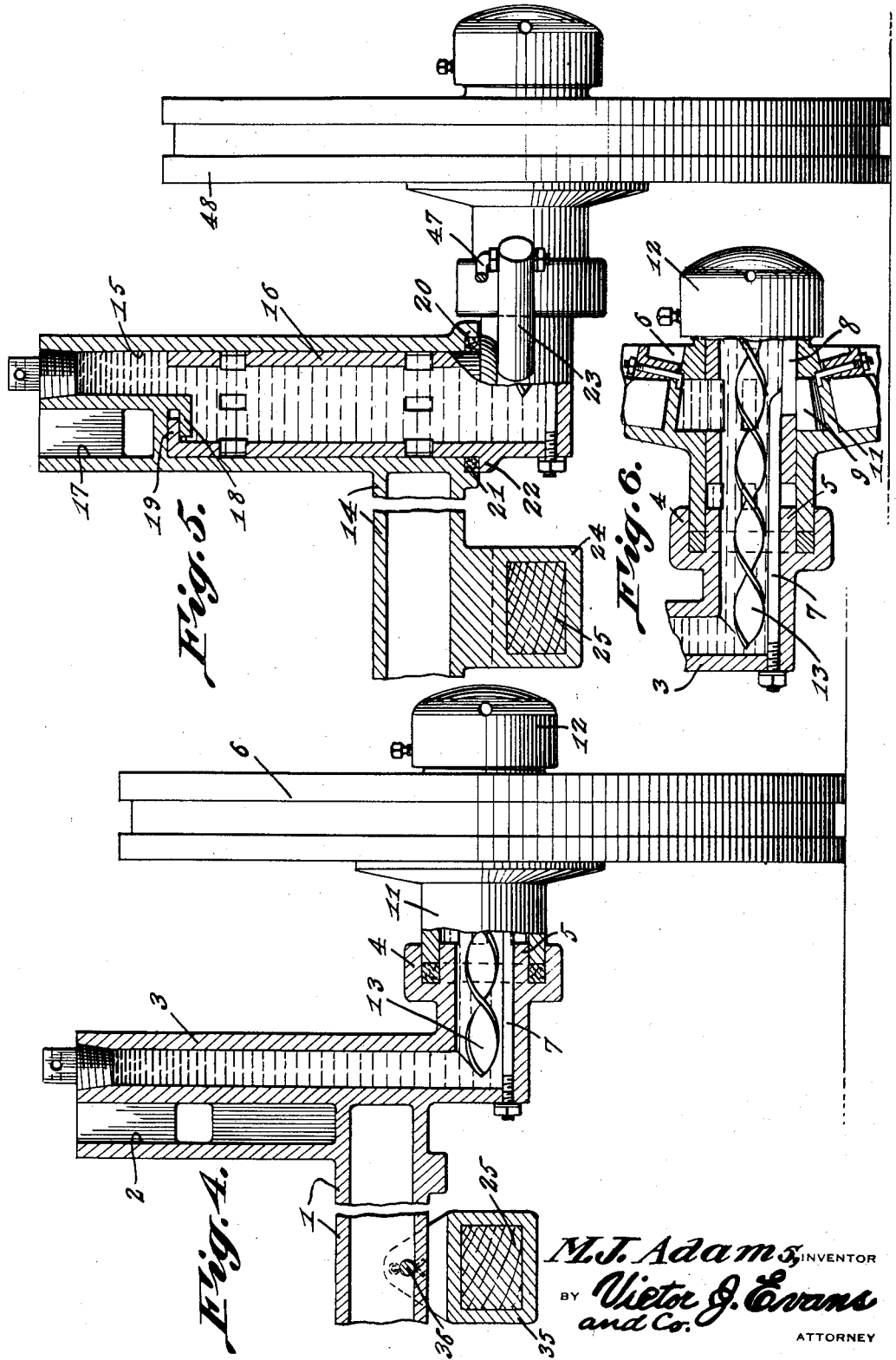

Patented Aug. 29, 1933

1,924,388

UNITED STATES PATENT OFFICE 1,924,388

RUNNING GEAR

Mathias J. Adams, Turkey River, Iowa

Application October 19, 1931. Serial No. 569,784

1 Claim. (Cl. 280—80)

This invention relates to vehicles; and its general object is to provide a running gear for vehicles, that is adjustable in a manner whereby the axles can be adjusted with respect to each other in an easy and expeditious manner and held accordingly without fear of casual separation or displacement.

Another object of the invention is to provide a running gear that includes means whereby the front wheels are capable of rotation in a horizontal plane and therefore they materially aid in the steering.

A further object of the invention is to provide a running gear that is light in weight, but is strong and sturdy, simple in construction, and extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a top plan view of the running gear which forms the subject matter of the present invention, with the draft and steering mechanism in full and dotted lines.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Figure 4 is a fragmentary sectional view illustrating the rear axle structure with parts in section and in elevation.

Figure 5 is a similar view of the front axle structure.

Figure 6 is a sectional view taken through the hub and spindle and showing the wheel retaining means.

Referring to the drawings in detail, the reference numeral 1 indicates the rear axle which has formed therewith stake sockets 2 and also has formed therewith oil reservoirs 3, the latter being of substantially L-shape formation with the vertical portions thereof arranged parallel with the stake sockets, while the horizontal portions beyond the collars 4 provide spindles 5 for wheels 6.

The wheels are held on the spindles through the instrumentality of bolts having rounded portions 7 which are provided with threaded ends, and these rounded portions are formed with squared portions 8 that have secured thereto blocks 9, the latter being received within grooves 10 formed interiorly of the hubs 11 of the wheels to prevent longitudinal movement of the bolts and the rounded portion of the bolts extend through the spindles with their threaded ends passed through openings formed in the inner ends of the horizontal portions of the oil reservoirs, and the threaded ends receive nuts as clearly shown in Figure 4. The outer ends of the hubs are threaded to accommodate caps 12 which have secured thereto and extending inwardly therefrom spiral rods 13 for the purpose of insuring proper lubrication of the wheels at all times as the spindles are provided with slots for the passage of lubricant to the hubs, but it might be mentioned that the lubricating system does not form a part of the present application and is disclosed by my co-pending application entitled Automatic force oiling vehicle gear, Serial No. 426,413 and is mentioned here merely for the purpose of describing its features relative to the running gear. The hubs are received by the collars 4 which have arranged therein gaskets to provide a leak proof connection between the hub and collar as will be apparent.

The front axle is indicated by the reference numeral 14 and has formed with the ends thereof chambers 15 which act in the capacity as reservoirs and for the purpose of receiving for rotation therein upright sleeves 16 which are formed with the inner ends of the spindle portions for the front wheels that are retained on their spindles through the instrumentality of structure identical to the strucure employed for the rear wheels.

The upper ends of the chambers 19 have formed therewith stake sockets 17 and arranged below the stake sockets are tongues 18 disposed in spaced relation with respect to the bottom of the stake sockets as clearly shown in Figure 5 for the purpose of accommodating tongues 19 formed with the inner side portions of the upper ends of the upright sleeves 16, whereby the upright sleeves are held in cooperative association with respect to the chambers 19 for rotation therein as will be apparent.

The lower ends of the chambers 15 are provided with flanges 20 which receive gaskets 21 and the sleeves 16 are formed with bearing bosses 22 which surround the sleeves and which engage the gaskets in a manner to provide a leak proof connection between the sleeves and chambers 15. By this construction, it will be obvious that the front wheels are mounted for rotation in a horizontal plane and extending from the sleeves 16 below the gaskets 21 are stud rods 23 for a purpose which will be presently apparent.

The front axle has formed with its lower portion centrally thereof a sleeve member 24, square in cross section, through which passes the reach rod 25 and which is held therein through the instrumentality of bolt and nut connections 26. Arranged in spaced relation and row formation in the reach rod 25 are a plurality of openings 27 for the purpose of receiving a bolt 28 that secures a bracket member 29 to the reach rod as shown in Figure 1, and the bolt 28 passes through spaced parallel horizontally disposed ears 30 of the bracket member 29 which likewise is provided with spaced parallel arranged ears 31 rising therefrom and which are formed with openings to receive a bolt 32. A substantially V-shaped hound 33 has the remote ends of its arms formed integral with the rear axle, and the apex of the hound 33 is crimped to provide what may be termed a bearing 34 which is held between the ears 31 through the instrumentality of the bolt 32. This construction provides for movement of the hound and therefore prevents binding. The reach rod 25 has slidably mounted thereon a bracket 35 that is likewise provided with upstanding ears adapted to receive a bolt 36 that is passed through the rear axle for securing the latter with respect to the reach rod through the medium of the hounds.

This structure provides for the adjustment of the axles with respect to each other and this adjustment can be accomplished by associating the bolt 28 with anyone of the openings 27 in the reach rod, and of course the bracket members 29 and 35 are slidably mounted on the reach rod to allow for the adjustment.

The bolt and nut connection 26 not only secures a reach rod in the sleeve member 24, but also pivotally secures a plate member 37 to the sleeve member as clearly shown in Figure 2, and this plate member is provided with apertured ears 38 that receive a bolt and nut connection 39 which passes through a sleeve 40, the latter being formed with a bracket member 41 having an apertured lug 42 extending horizontally therefrom and in parallelism with a socket member 43, which receives the tongue 44, while disposed between the apertured lug 42 and the upper plate of the socket member 43 is a double tree 45, the latter being mounted for pivotal movement and of course any type of similar means can be substituted therefor if desired. The double tree and the tongue are held in operative position through the instrumentality of bolt and nut connections 46.

The plate member 37 is provided with openings to receive the adjacent ends of radius rods 47 while the opposite ends of these radius rods are received in the outer ends of the stub rods 23. By this construction, it will be apparent that movement of the tongue will cause the turning of the front wheels as shown in dotted lines in Figure 1.

The rear wheels 6 and the front wheels which are indicated by the reference numeral 48 may be of any desired construction, but it will be noted that I have shown the wheels as being provided with tires which are provided with circumferentially arranged grooves.

From the above description and disclosure of the drawings, it will be seen that I have provided a running gear which not only includes means for adjustably associating the axles with respect to each other, whereby the adjustment can be accomplished in an expeditious manner but includes a novel draft and steering gear mechanism whereby turning of the tongue will move the front wheels in a horizontal plane in accordance with the movement of the tongue.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

In a vehicle, a running gear including hollow metallic front and rear axles, wheels associated with said axles, a sleeve having the front axle fixed thereto, a reach rod adjustably secured in said sleeve and having the rear axle connected thereto for pivotal movement, a substantially V-shaped one piece hound having its remote ends secured to the rear axle and its apex end crimped in downwardly curved formation to provide a bearing, a bracket member adjustably mounted on the reach rod, vertical ears included in the bracket member and receiving the downwardly curved crimped portion between the same, detachable means passing through the ears and received in the downwardly curved crimped portion for rockably securing the latter to the bracket, a draft means including a plate member pivotally secured to the sleeve at its forward end, radius rods pivotally secured to the plate member and having connection with the front wheels for turning the latter to steer the vehicle, and a tongue having pivotal connection with the plate member.

MATHIAS J. ADAMS.